March 13, 1945.  C. G. OLSON  2,371,463
DIE
Original Filed Aug. 27, 1938

INVENTOR.
Carl G. Olson
By: Loftus Moore Olson & Trexler
attys.

Patented Mar. 13, 1945

2,371,463

UNITED STATES PATENT OFFICE 2,371,463

DIE

Carl G. Olson, Chicago, Ill., assignor to Illinois Tool Works, Chicago, Ill., a corporation of Illinois Original application August 27, 1938, Serial No. 227,045, now Patent No. 2,303,224, dated November 24, 1942. Divided and this application November 21, 1942, Serial No. 466,427

4 Claims. (Cl. 80—9)

This invention relates to screw and lock washer assemblies, and more particularly to apparatus for making the screws for such assemblies. It relates more specifically to a die for making screws for permanent association with a lock washer prior to the application of a screw to a work piece.

This application is a division of my copending application, Serial No. 227,045, filed August 27, 1938, on an improvement in Methods and means for assembling screws and lock washers, now Patent No. 2,303,224, issued November 24, 1942.

An object of the invention is to provide improved means for producing screws for screw and lock washer assemblies, wherein the lock washer is effectively held in permanent association with the screw while leaving the locking portions of the washer free to engage the work piece.

A further object of the invention is to provide means for forming a screw for a screw and lock washer assembly, wherein the screw has annularly disposed means, preferably a continuous annular rib or protuberance, for holding the washer in assembled position thereon.

Another object of the invention is to provide a die for forming simultaneously upon the shank of a screw blank a screw thread and an annular protuberance or rib between the thread and the head of the screw to hold a washer on the shank of the screw between the head and the protuberances.

Other and further objects and advantages of the invention will be apparent from the following description when taken in connection with the accompanying drawing, wherein—

Figure 1:
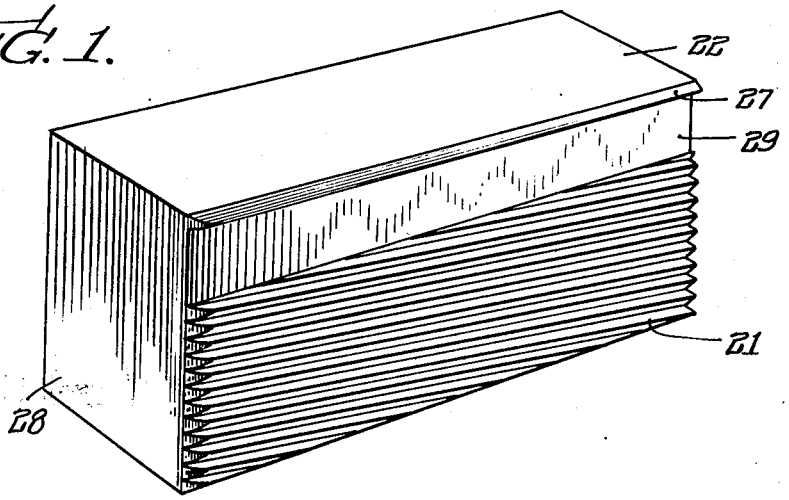
Figure 2:
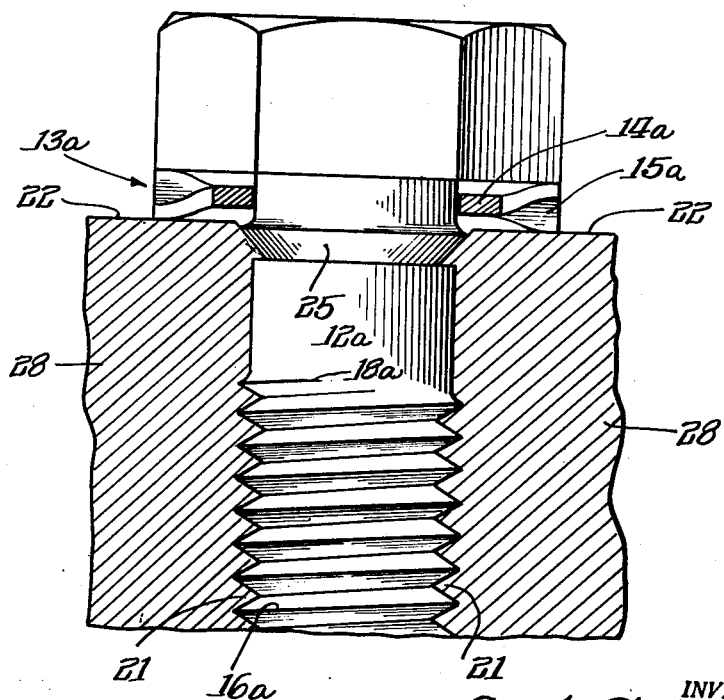

Figure 1 is a detail perspective view of one of the die blocks which, according to the invention, may be used for rolling a thread and a washer retaining rib upon a screw blank; and Figure 2 is a view in vertical section illustrating the rolling of the thread and the washer retaining rib, the left-hand die block being shown in section taken substantially along the line 2—2 of Figure 1.

In the patents to E. C. Crowther, Nos. 2,113,424 and 2,113,425, dated April 5, 1938, there is disclosed a screw and lock washer assembly wherein the lock washer is held upon the shank of the screw by means of the screw thread, the thread being rolled on the screw after the washer has been placed in position thereon. During the thread rolling operation the metal of the thread is upset or displaced so that the outer diameter of the thread is greater than the normal diameter of the screw shank prior to the thread rolling operation. The washer, which has its internal diameter only slightly greater than this normal diameter, is accordingly held in permanent association with the screw, forming a screw and lock washer assembly which may be effectively applied as a unit to a work piece. In devices of the type shown in the patents, the thickness of the lock washer body, or in the case of lock washers of the internally extending twisted tooth type the additional effective thickness of the washer imparted by the twisting of the teeth, is relied upon to prevent the washer from unthreading itself from the screw by working its way along the length of the threads in the manner of a nut.

As shown in Figure 2, an annular rib 25 is formed on the screw 12a, a lock washer 13a being arranged on the shank between the rib and the underside of the screw head.

The lock washer is illustrated as being of the external tooth type comprising an annular rib 14a and externally extending twisted teeth 15a, but it is to be understood that any suitable form of lock washer may be employed.

The inner diameter of the lock washer is slightly less than the diameter of the rib 25, and the rib accordingly forms an effective barrier, holding the lock washer in permanent association with the screw and against any inadvertent separation therefrom. Being of annular shape, it is impossible for the lock washer to be moved inadvertently over the rib as long as the inner diameter of the washer is any appreciable amount less than the diameter of the rib.

By placing the washer upon the screw shank prior to the formation of the rib 25, the parts are automatically, permanently assembled as the rib is formed. In this construction the rib 25 is independent of the screw thread 16a. The rib acts as an independent retention means. Accordingly, the upper end 18a of the screw thread may be spaced at some distance from the screw head, as shown or the external diameter of the screw thread may be no greater or less than the original diameter of the screw shank and still the washer will be held in properly assembled position. In some types of screws it is desirable to terminate the upper end of the thread at a considerable distance from the underside of the screw head, and it is frequently also desirable to so form the thread that its exterior diameter will be no greater than the normal diameter of the screw shank. The use of an independent annular retaining rib formed on the screw shank at the upper end thereof, immediately below the washer, forms an effective means for holding the washer in proper assembled position in such types of screw constructions.

Each thread rolling die, as 28, may comprise a block provided with threads 21 for rolling the thread on the shank of the screw. It is to be understood that in rolling the thread, the screw shank is rolled between a pair of similar cooperating die blocks 28 as shown in Figure 2, with the assembled lock washer arranged between the upper face 22 of the blocks and the underside of the screw head. The die threads terminate below the upper edge of the block, at or adjacent which edge the die block is provided with a horizontally extending rib 27. The rib 27 on each die block is, like the conventional threads 21, of increasing depth from the entering to the rear end of the die block so as to extrude the material from the shank of the screw as the screw is rolled between the die blocks to form the annular rib or protuberance 27.

As shown in Figure 1, the thread forming or cutting teeth 21 extend longitudinally of the block and are inclined at the helix angle of the thread to be formed, while the rib forming or cutting tooth or protuberance 27 extends longitudinally of the block in a plane substantially at right angles to the working face of the die. Between the tooth 27 and the teeth 21 each die block has a recessed plane surface 29; and the dies, when rolling the thread and the protuberance 25, are so spaced apart that the distance between the corresponding plane surfaces 29 is substantially equal to the normal outer diameter of the shank of the screw.

The screw blank and washer may be assembled by any suitable assembly mechanism such, for example, as illustrated in Figures 8 and 9 of my copending application, Serial No. 227,045, filed August 27, 1938, now Patent No. 2,303,224, hereinbefore noted.

It will be evident that die blocks formed according to this invention provide simple and expeditious means for forming the screw of a screw and lock washer assembly, in which the washer is retained on the screw shank independently of the thread by an annular protuberance which in external diameter exceeds the internal diameter of the assembled washer.

Obviously the invention is not limited to the particular structural details disclosed herein but is capable of other modifications and applications covered by the following claims.

What I claim is:

1. Means for forming a screw to retain a washer upon its shank, said means comprising a die having on its working face thread cutting teeth inclined relative to a plane perpendicular to said face at the helix angle of the thread to be formed, and said working face having a rib forming tooth extending in a plane substantially parallel to said first plane for forming on the screw simultaneously with the thread an annular washer retaining rib substantially perpendicular to the axis of the screw.

2. Means for forming a screw to retain a washer upon its shank, said means comprising a die having on its working face a plurality of parallel thread cutting teeth inclined relative to a plane perpendicular to said face at the helix angle of the threads to be formed, a rib cutting and upsetting tooth extending in a plane substantially parallel to said first plane for forming on the screw shank, simultaneously with the thread, an annular washer retaining rib substantially perpendicular to the axis of the screw, and a recessed plane surface between the thread cutting teeth and the rib cutting tooth.

3. Means for forming a screw to retain a washer upon its shank, said means comprising a pair of dies each having on its working face thread cutting teeth inclined relative to a plane perpendicular to said face at the helix angle of the thread to be formed, a rib forming tooth in a plane substantially parallel to said first plane and shaped to form on the screw, simultaneously with the thread, an annular washer retaining rib in a plane substantially perpendicular to the axis of the screw, and a recessed plane surface between the thread cutting tooth and the rib forming tooth, said dies being positioned in confronting spaced apart relation with the distance between the confronting plane surfaces of the dies substantially equal to the shank diameter of the screw blank.

4. Means for forming a screw to retain a washer upon its shank, said means comprising a pair of elongated die blocks spaced apart to receive the shank of a screw blank therebetween and having upper co-planar surfaces to support the washer assembled on the screw blank beneath the thread thereof, each die block having in its working face thread cutting teeth inclined at the helix angle of the thread to be formed, a rib cutting tooth in a plane substantially at right angles to the face of the die block and extending longitudinally of the block, and a recess in the working face of the die block between the thread cutting teeth and the rib forming tooth, said rib forming tooth being located adjacent the washer supporting surface of each die block.

CARL G. OLSON.